United States Patent
Klein et al.

(10) Patent No.: US 12,004,458 B2
(45) Date of Patent: *Jun. 11, 2024

(54) HYDROPONIC TOWER COMPATIBLE PLANT PLUG HOLDER

(71) Applicant: MJNN LLC, South San Francisco, CA (US)

(72) Inventors: Brice Leon Klein, San Francisco, CA (US); Alex Ibrahim, Pacifica, CA (US); Matthew James Matera, San Francisco, CA (US); Nicholas Kalayjian, San Carlos, CA (US); Frank Spiteri, Palo Alto, CA (US)

(73) Assignee: MJNN LLC, South San Francisco, CA (US)

( * ) Notice: Subject to any disclaimer, the term of this patent is extended or adjusted under 35 U.S.C. 154(b) by 542 days.

This patent is subject to a terminal disclaimer.

(21) Appl. No.: 17/212,580

(22) Filed: Mar. 25, 2021

(65) Prior Publication Data

US 2021/0289714 A1  Sep. 23, 2021

Related U.S. Application Data

(63) Continuation of application No. 16/577,151, filed on Sep. 20, 2019, now Pat. No. 10,986,787, which is a (Continued)

(51) Int. Cl.
*A01G 31/06* (2006.01)
*A01G 9/02* (2018.01)
*A01G 31/02* (2006.01)

(52) U.S. Cl.
CPC .............. *A01G 9/023* (2013.01); *A01G 31/02* (2013.01); *A01G 31/06* (2013.01)

(58) Field of Classification Search
CPC ......... A01G 9/047; A01G 31/04; A01G 31/06
See application file for complete search history.

(56) References Cited

U.S. PATENT DOCUMENTS 3,896,587 A   7/1975  Insalaco
4,033,072 A   7/1977  Kobayashi et al.
(Continued)

OTHER PUBLICATIONS

Final Office Action dated Dec. 4, 2020 in U.S. Appl. No. 15/910,796, 14 pgs.
(Continued)

*Primary Examiner* — Morgan T Jordan
(74) *Attorney, Agent, or Firm* — Almanac IP Advisors LLP

(57) ABSTRACT

A plant plug holding unit is provided, the plant plug holding unit including at least one plant plug holder. The plant plug holding unit, which is configured to be inserted into a cut-out in a hydroponic tower face plate, includes an edge member that encircles the unit and is sealed to the rear surface of the front tower face. Each individual plant plug holder of the plant plug holding unit includes (i) a base member configured to support a plant plug and which extends rearward from the edge member and into the hydroponic tower cavity; (ii) a top shroud member that inhibits leakage as well as plug erosion; (iii) a pair of side members that maintain the position of the plant plug within the plug holder; and (iv) a plurality of open regions configured to promote water drainage from the plant plug.

20 Claims, 6 Drawing Sheets

Related U.S. Application Data continuation-in-part of application No. 15/910,796, filed on Mar. 2, 2018, now Pat. No. 10,986,791.

(56) References Cited

U.S. PATENT DOCUMENTS

| | | | |
|---|---|---|---|
| 5,251,399 A | 10/1993 | Rasmussen | |
| 5,502,923 A | 4/1996 | Bradshaw | |
| 5,555,676 A | 9/1996 | Lund | |
| 5,913,477 A | 6/1999 | Dean | |
| 5,918,416 A | 7/1999 | Ammann, Jr. | |
| 6,000,173 A * | 12/1999 | Schow | A01G 31/02 47/60 |
| 6,477,805 B2 | 11/2002 | Ware | |
| 6,615,542 B2 * | 9/2003 | Ware | A01G 9/025 47/83 |
| 7,171,782 B2 | 2/2007 | Felknor et al. | |
| 9,968,039 B2 * | 5/2018 | Graber | A01G 31/06 |
| 10,499,575 B2 | 12/2019 | Stoltzfus et al. | |
| 2003/0089037 A1 | 5/2003 | Ware | |
| 2008/0078118 A1 | 4/2008 | Bissonnette et al. | |
| 2011/0258925 A1 | 10/2011 | Baker | |
| 2012/0279126 A1 | 11/2012 | Simmons | |
| 2014/0290137 A1 | 10/2014 | Nagels et al. | |
| 2015/0173314 A1 | 6/2015 | Buonaiuto, Jr. et al. | |
| 2015/0313104 A1 | 11/2015 | Cottrell | |
| 2016/0050863 A1 | 2/2016 | Graber | |
| 2016/0066525 A1 | 3/2016 | Duquesnay et al. | |
| 2016/0120141 A1 | 5/2016 | Stolzfus et al. | |
| 2016/0135398 A1 | 5/2016 | Mathieu et al. | |
| 2016/0143234 A1 | 5/2016 | Nasu | |
| 2017/0055473 A1 | 3/2017 | Baker | |
| 2017/0094896 A1 | 4/2017 | Knaap et al. | |
| 2017/0105372 A1 | 4/2017 | Bryan | |
| 2017/0202164 A1 | 7/2017 | Dufresne | |
| 2017/0238486 A1 | 8/2017 | Feo et al. | |
| 2017/0339841 A1 | 11/2017 | Monasterio | |
| 2018/0007849 A1 | 1/2018 | Cohen et al. | |
| 2018/0042186 A1 | 2/2018 | Kop | |
| 2018/0042191 A1 | 2/2018 | Blackburn et al. | |
| 2018/0084744 A1 | 3/2018 | Tidona | |
| 2018/0092314 A1 | 4/2018 | McGuinness et al. | |
| 2018/0125015 A1 | 5/2018 | Marshall | |
| 2018/0213734 A1 | 8/2018 | Smith et al. | |
| 2018/0295800 A1 | 10/2018 | Kiernan | |
| 2018/0325038 A1 | 11/2018 | Spiro | |
| 2018/0325052 A1 | 11/2018 | Gru et al. | |
| 2018/0368346 A1 | 12/2018 | Watson | |
| 2019/0082617 A1 | 3/2019 | Moffitt et al. | |
| 2019/0082627 A1 | 3/2019 | Moffitt et al. | |
| 2019/0166778 A1 | 6/2019 | Hendrick et al. | |
| 2019/0200551 A1 | 7/2019 | Walters | |
| 2019/0269080 A1 | 9/2019 | Whitworth et al. | |
| 2019/0269081 A1 | 9/2019 | Whitworth et al. | |
| 2020/0008366 A1 | 1/2020 | Klein et al. | |
| 2020/0008378 A1 | 1/2020 | Buuren et al. | |

OTHER PUBLICATIONS

Non-Final Office Action dated Feb. 28, 2020 in U.S. Appl. No. 15/910,796, 16 pgs.

Notice of Allowance dated Jan. 22, 2021 in U.S. Appl. No. 15/910,796, 9 pgs.

Notice of Allowance dated Jan. 25, 2021 in U.S. Appl. No. 16/577,151, 13 pgs.

Restriction Requirement dated Dec. 2, 2019 in U.S. Appl. No. 15/910,796, 6 pgs.

U.S. Appl. No. 15/910,796, filed Mar. 2, 2018, Titled: Hydroponic Tower Compatible Plant Plug Holder, 67 pgs.

U.S. Appl. No. 17/212,557, filed Mar. 25, 2021, Titled: Hydroponic Tower Compatible Plant Plug Holder, 58 pgs.

* cited by examiner

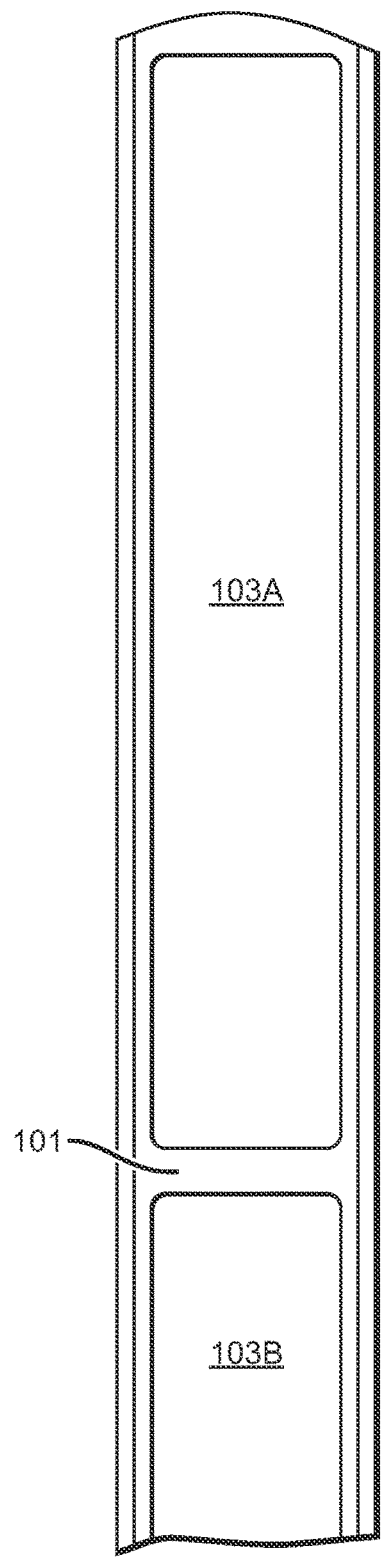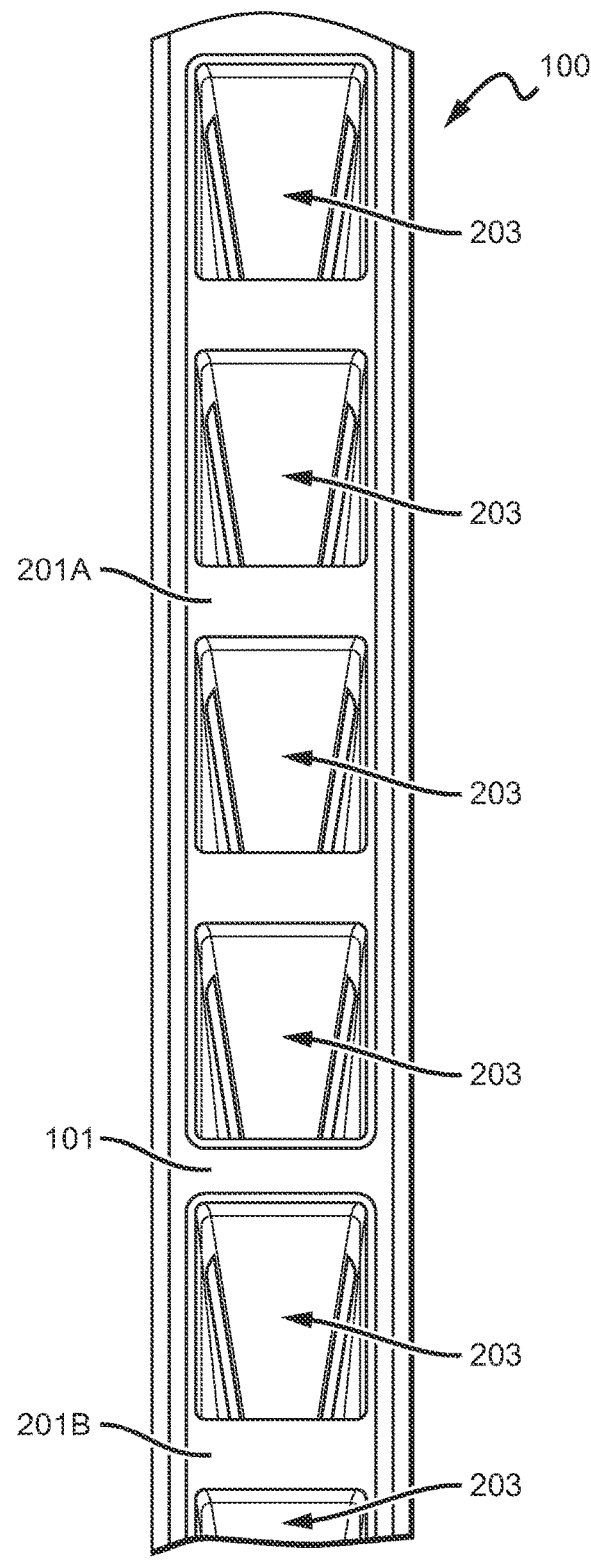

HYDROPONIC TOWER COMPATIBLE PLANT PLUG HOLDER

CROSS-REFERENCE TO RELATED APPLICATION

This application is a continuation of U.S. patent application Ser. No. 16/577,151 filed Sep. 20, 2019, which is a continuation-in-part of U.S. patent application Ser. No. 15/910,796, filed 2 Mar. 2018, the disclosure of which is incorporated herein by reference for any and all purposes.

FIELD OF THE INVENTION

The present invention relates generally to hydroponic growing systems and, more particularly, to a plant plug holder configured to hold a seedling within a hydroponic tower while it grows from seedling to mature plant.

BACKGROUND OF THE INVENTION

Given the continued growth of the world's population, and given that the regions allocated for agricultural pursuits have decreased or simply become less favorable to such activities, the ability of conventional farms to feed the world's growing population has become increasingly taxed. Additionally, since population centers and agricultural centers are frequently not co-located, and due to the time and expense associated with shipping agricultural goods, in many regions of the world only the wealthy are able to obtain adequate supplies of non-processed food, i.e., raw fruits and vegetables. Furthermore, the fruits and vegetables that do reach population centers are likely to be of decreased nutritional content and flavor, both due to the distance that they have traveled and the fact that much of today's produce is bred for durability and fertility rather than flavor & nutrition. As a result, there has been a renewed interest in soilless growing techniques that do not require the use of pesticides, drastically reduce the use of water, and allow for growing varietals that are bred for nutrition and flavor instead of durability.

Hydroponics is a soilless growing technique in which plants are grown using a liquid solution of water and nutrients. The roots of the plants are typically maintained in a fibrous or granular material, often comprised of plastic, and fed via a wick, drip, nutrient film, or other nutrient delivery system. Hydroponic growing systems are often established within indoor facilities, thus allowing them to be located in or near population centers. This approach also provides exceptional climate control (i.e., temperature, humidity, air flow, $CO_2$ concentration, light wavelength, intensity and duration, etc.) as well as improved pest and disease control, thus allowing an indoor hydroponic farm to succeed in a region in which the outside environment and/or the soil conditions are inhospitable to the use of conventional farming techniques. Furthermore, hydroponic and other soilless growing techniques can yield extremely high plant densities, especially in those instances in which either horizontal stacking systems or vertical growth towers are used.

While hydroponic farming techniques offer a number of advantages over conventional farming techniques, in order to achieve large-scale adoption of these techniques it is vital that the cost per plant be competitive with the costs associated with conventional farming techniques. Accordingly, the present invention provides a plant plug holder that achieves increased planting consistency and simplified tower maintenance while minimizing tower leakage.

SUMMARY OF THE INVENTION

The present invention provides a hydroponic system that includes a hydroponic tower and a plant plug holding unit. The tower face plate of the hydroponic tower includes at least one cut-out. The plant plug holding unit, which is configured to be inserted within the tower face plate cut-out, includes an edge member that encircles the plant plug holding unit. A front surface of the edge member is proximate a rear tower surface of the tower face plate when the plant plug holding unit is fully inserted into the tower face plate cut-out. Integrated into the plant plug holding unit is at least one plant plug holder. Each plant plug holder includes (i) an opening configured to receive a plant plug, (ii) a base member that extends rearward from the back surface of the edge member into the central cavity of the hydroponic tower, where the base member is configured to support the plant plug within the plant plug holder, (iii) a top shroud member that extends rearward from the back surface of the edge member into the central cavity of the hydroponic tower, where the top shroud member is configured to limit plant plug erosion, and (iv) a pair of side members that extend rearward from the back surface of the edge member into the central cavity of the hydroponic tower and which are configured to maintain the position of the plant plug within the plant plug holder.

In one aspect, a seal may be formed between the front surface of the edge member and the rear tower surface of the tower face plate, where the seal circumscribes the plant plug holding unit. The seal may be formed by bonding, ultrasonic welding, vibrational welding, or other means.

In another aspect, the plant plug holding unit may include a front shroud that extends out and away from the front surface of the edge member, where the front shroud encircles the at least one plant plug holder, and where the front shroud extends into the cut-out of the tower face plate. The front edge surface of the front shroud is preferably coplanar with the front tower surface of the tower face plate when the plant plug holding unit is fully inserted into the tower face plate cut-out.

In another aspect, the junction between the top shroud member and the back surface of the edge member may be continuous; the junction between a first side member of the pair of side members and the back surface of the edge member may be continuous; and the junction between a second side member of the pair of side members and the back surface of the edge member may be continuous.

In another aspect, a first open region (e.g., an open-ended slot) may be located between the base member and the first member of the pair of side members, where the first open region is directly adjacent to the top surface of the base member, and where the first open region is configured to promote water drainage from the base member top surface. A second open region (e.g., an open-ended slot) may be located between the base member and the second member of the pair of side members, where the second open region is directly adjacent to the top surface of the base member, and where the second open region is configured to promote water drainage from the base member top surface.

In another aspect, a first open region (e.g., an open-ended slot) may be located between the top shroud member and the first member of the pair of side members, where the first open region is directly adjacent to the lower surface of the top shroud member. A second open region (e.g., an open-ended slot) may be located between the top shroud member and the second member of the pair of side members, where the second open region is directly adjacent to the lower surface of the top shroud member.

In another aspect, the rearmost edge of the base member may be located within 0.1 inches of the inside rear surface of the central cavity of the hydroponic tower when the plant plug holding unit is fully inserted into the tower face plate cut-out.

In another aspect, the first and second side members of the pair of side members may be tapered inwards, and the base member and the top shroud member may be tapered inwards.

In another aspect, when the plant plug is fully inserted into the plant plug holder the top shroud member preferably covers at least a third of the plant plug's top surface.

In another aspect the plant plug holding unit, which may be injection molded as a single unit, is preferably fabricated from a plastic material (e.g., polyethylene, polypropylene, polyvinyl chloride, polytetrafluoroethylene, and acrylonitrile butadiene styrene), and preferably fabricated from a plastic material that is white.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

FIG. 1 provides a front planar view of a portion of hydroponic tower, this view showing the tower face cut-outs;

FIG. 2 provides the same front planar view as that shown in FIG. 1 with the inclusion of plant plug holding units mounted within the tower face cut-outs;

DESCRIPTION OF THE SPECIFIC EMBODIMENTS

Figure 3:
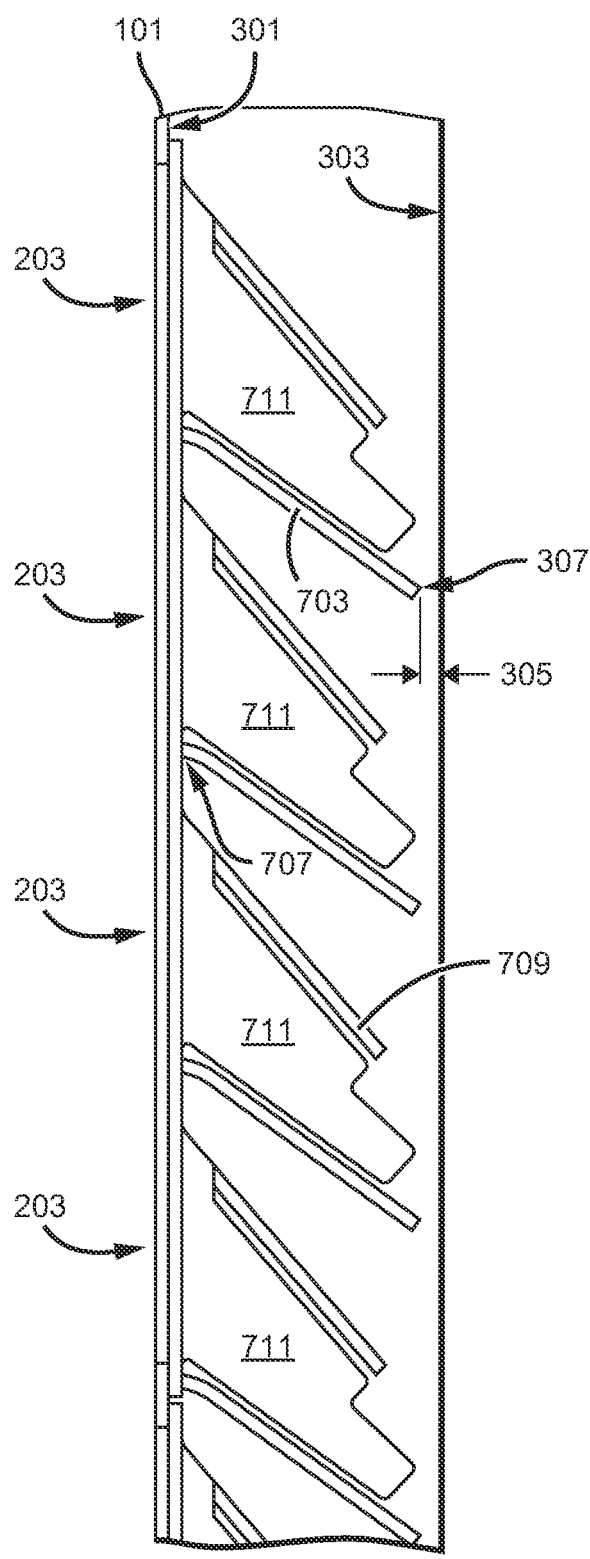
FIG. 3 provides a vertical cross-sectional view of a portion of the tower assembly shown in FIGS. 1 and 2.

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

In accordance with the invention, and as described below and illustrated in the figures, the present system combines one or more individual plant plug holders into a single unit, where the single plant plug holding unit is configured to be mounted to the rear surface of a hydroponic tower face plate. Preferably the single unit is configured to hold four individual plant plug holders as illustrated, although it should be understood that the single plant plug holding unit may be configured to hold more than four individual plant plug holders, or as few as a single individual plant plug holder. The inventors have found that combining multiple individual plant plug holders into a single unit simplifies tower system assembly and minimizes the risk of leaks between the tower cavity and the exterior environment. Regardless of the number of individual plant plug holders in the plant plug holding unit, it should be understood that the individual plant plug holders may be configured as described herein, or as described in parent U.S. patent application Ser. No. 15/910,796, assuming that the plant plug holding unit is attached to the rear surface of the hydroponic tower face rather than the front surface of the hydroponic tower face.

FIG. 1 provides a front planar view of a portion of a hydroponic tower 100. In this view, a portion of the tower face 101 is visible as well as tower face cut-outs 103A and 103B. The entire cut-out 103A is visible in this figure while only a portion of cut-out 103B is visible. Each cut-out 103 is sized to accommodate a plant plug holding unit. FIG. 2 provides the same front planar view as that shown in FIG. 1 with the inclusion of an entire plant plug holding unit 201A mounted within cut-out 103A, and a partially visible plant plug holding unit 201B mounted within cut-out 103B. Within plant plug holding unit 201A four individual plant plug holders 203 are visible. Within plant plug holding unit 201B one entire plant plug holder 203 is visible along with a partially visible second plant plug holder.

Figure 4:
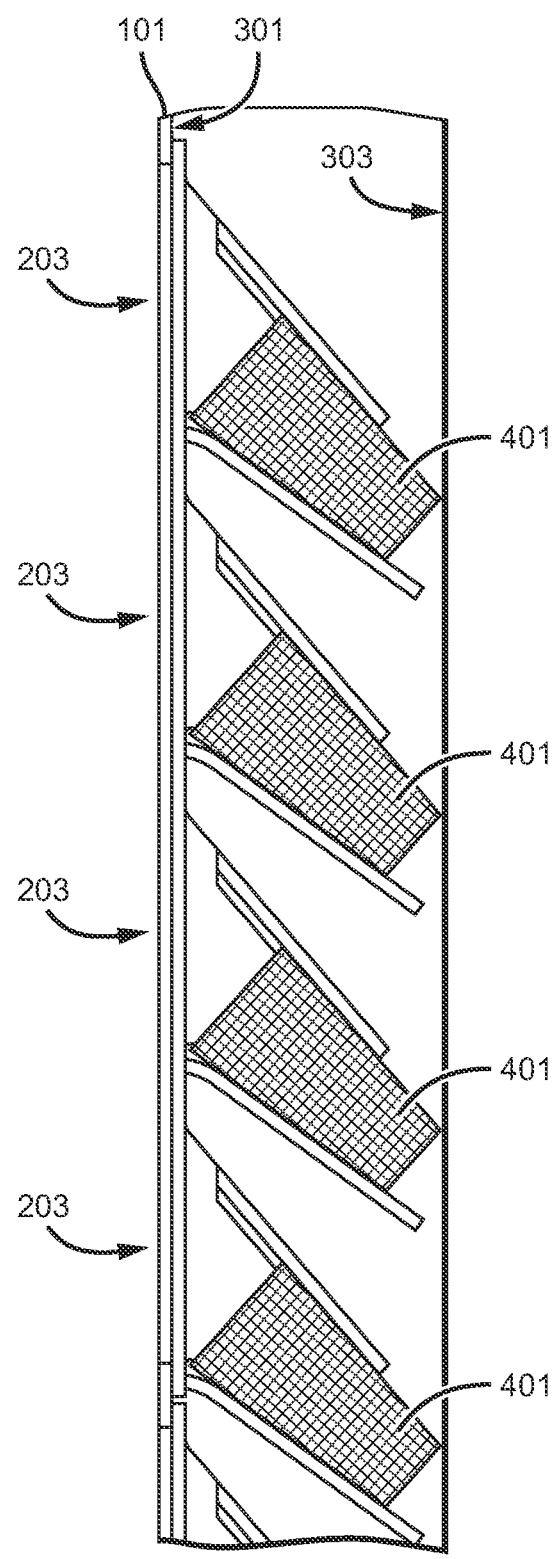
FIG. 4 provides the same view as that shown in FIG. 3, with the inclusion of plant plugs within each of the individual plant plug holders.

FIG. 3 provides a vertical cross-sectional view of a portion of the tower assembly shown in FIGS. 1 and 2. FIG. 4 provides the same cross-sectional view as that shown in FIG. 3, with the addition of plant plugs 401 within each of the individual plant plug holders. Note that in FIG. 4 only the plant plugs are shown, i.e., there are no seedlings or mature plants shown within the plugs 401.

The plant plug holding unit and the individual plant plug holders of the invention are not limited to use with a particular hydroponic tower design. For example, the tower can be extruded as a single piece tower. Alternately, the tower can utilize a multi-piece design, such as the multi-piece design disclosed in co-assigned and co-pending U.S. patent application Ser. No. 15/910,601, filed 2 Mar. 2018, or the multi-piece, hinged design disclosed in co-assigned and co-pending U.S. patent application Ser. No. 15/968,425, filed 1 May 2018 the disclosures of which are incorporated herein for any and all purposes. Cut-outs 103 can be punched out, machined (e.g., utilizing a computer numerical control (CNC) machine), or otherwise fabricated into the tower face. Although any of a variety of materials can be used in the manufacture of the tower, typically the tower is fabricated from plastic (e.g., polyethylene, polypropylene, polyvinyl chloride, polytetrafluoroethylene, acrylonitrile butadiene styrene, etc.), and more preferably from an opaque polyvinyl chloride (PVC) plastic that is colored white. Using an opaque PVC material that prevents light from entering the tower helps to minimize algae blooms while the white coloring increases the amount of light reflected back onto the plants.

Plant plug holding unit 201 and the individual plant plug holders 203 are preferably fabricated as a single unit, and preferably fabricated from plastic (e.g., polyethylene, polypropylene, polyvinyl chloride, polytetrafluoroethylene, acrylonitrile butadiene styrene, etc.). In the preferred embodiment, plant plug holding unit 201 and the individual plant plug holders 203 are fabricated as a single unit using injection molding, although it should be understood that other manufacturing techniques may be used to fabricate the plant plug holder assembly. As with the tower, preferably plant plug holding unit 201 and the individual plant plug holders 203 are manufactured using an opaque plastic (e.g., PVC) that is colored white to minimize algae blooms within the tower and increase reflected light.

Figure 5:
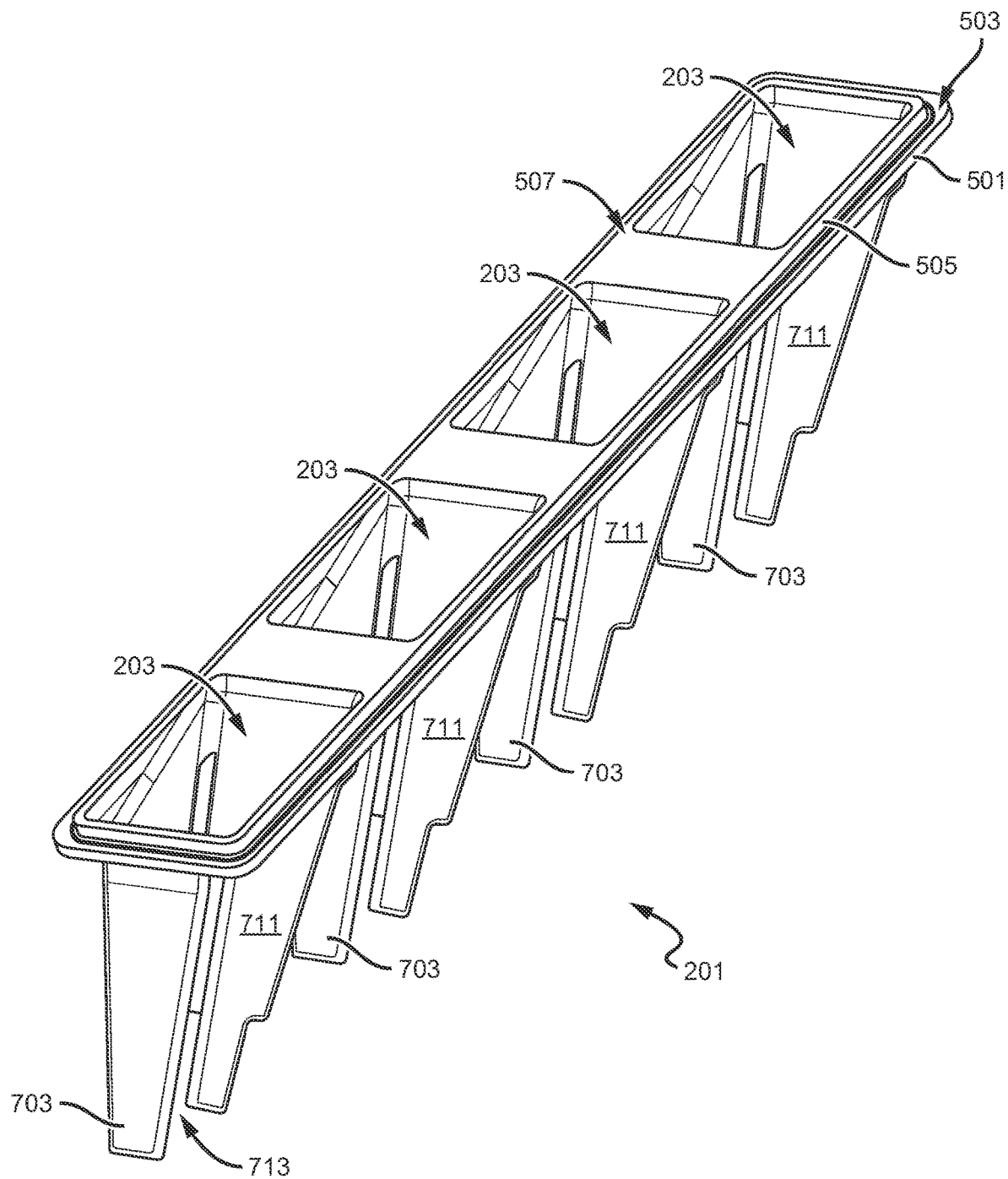
FIG. 5 provides a perspective view of a single plant plug holding unit, the illustrated unit including four individual plant plug holders.
Figure 6:
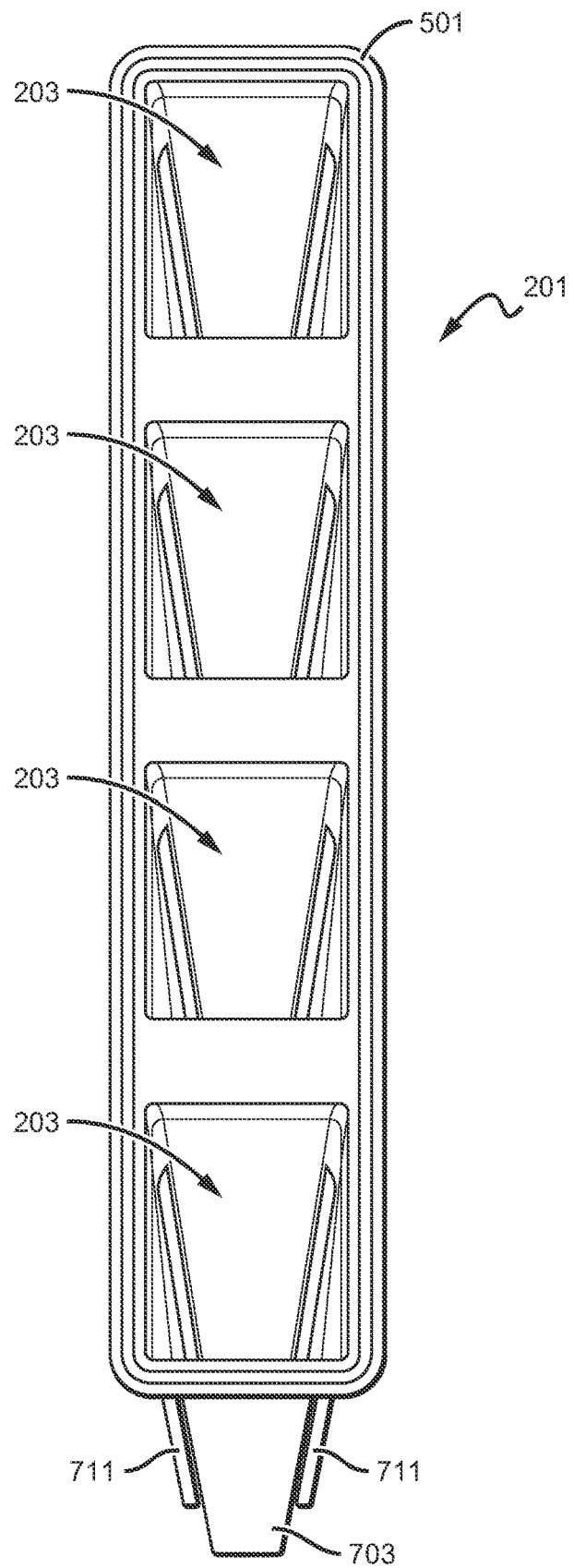
FIG. 6 provides a front view of the plant plug holding unit shown in FIG. 5.
Figure 7:
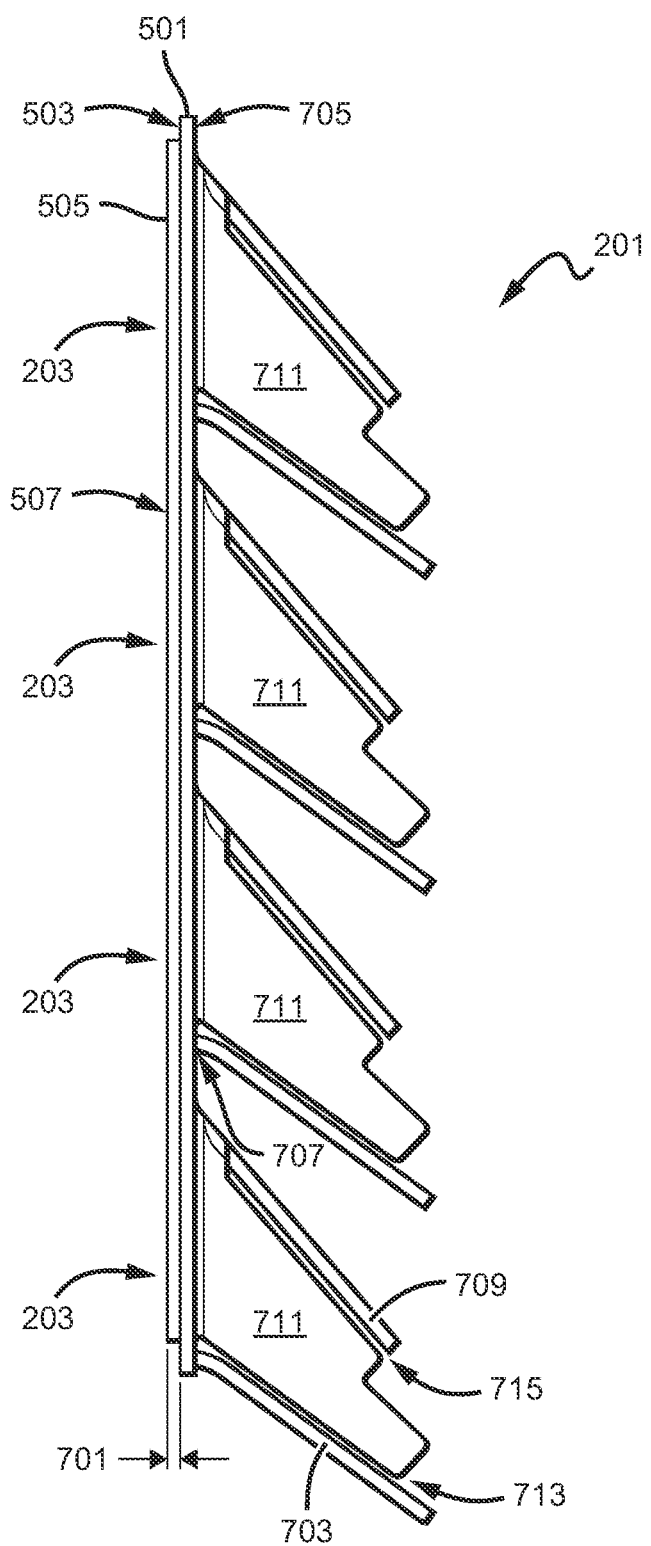
FIG. 7 provides a side view of the plant plug holding unit shown in FIGS. 5 and 6.
Figure 8:
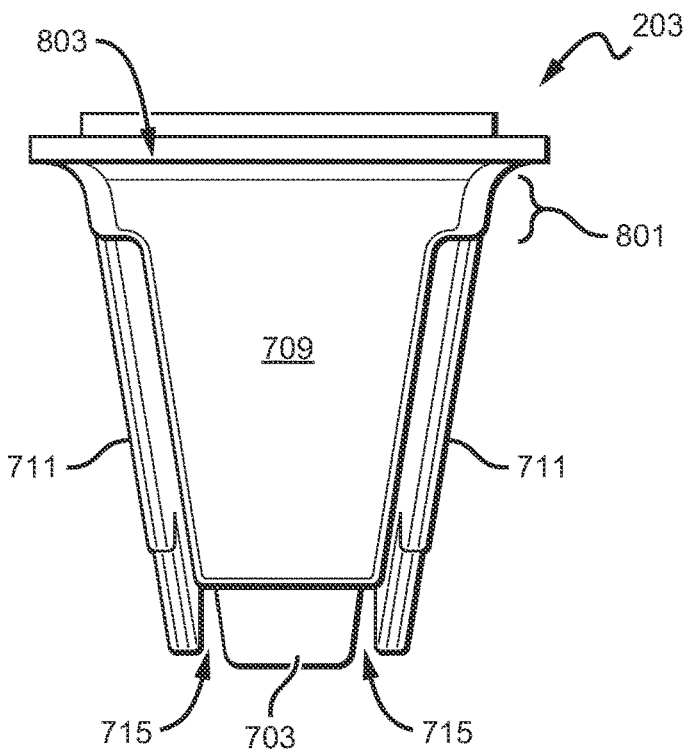
FIG. 8 provides a top view of one of the individual plant plug holders shown in FIGS. 5-7.
Figure 9:
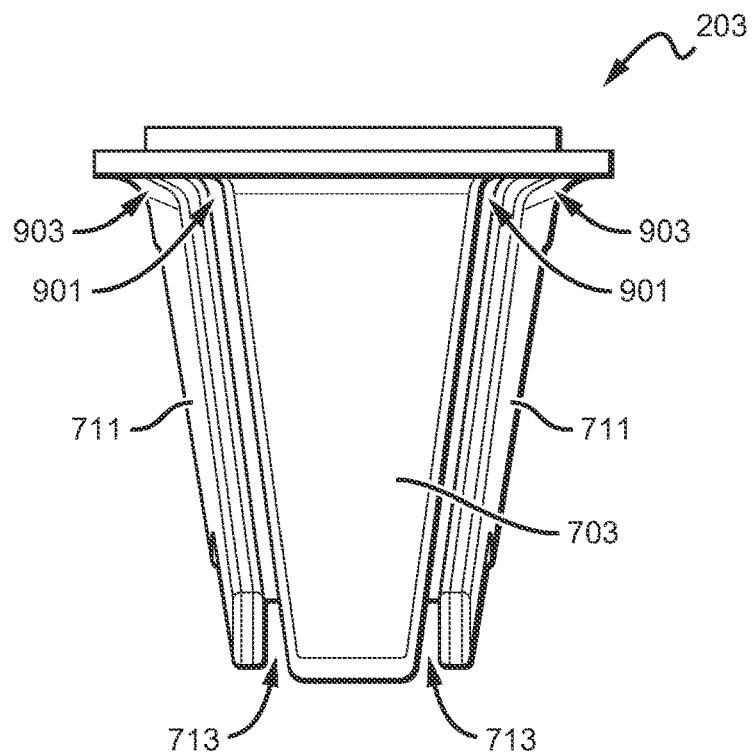
FIG. 9 provides a bottom view of the individual plant plug holder shown in FIG. 8.

FIG. 5 provides a perspective view of a preferred embodiment of a single plant plug holding unit 201, unit 201 including four individual plant plug holders 203. As previously noted, the inventors envision that each plant plug holding unit may include more than four individual plant plug holders, or as few as one individual plant plug holder. Furthermore and as described above, a typical hydroponic tower includes multiple cut-outs 103, integrated into each of which is a plant plug holding unit such as that shown in FIG. 5. FIG. 6 provides a front view of the plant plug holding unit shown in FIG. 5. FIG. 7 provides a side view of the plant plug holding unit shown in FIGS. 5 and 6. FIGS. 8 and 9 provide top and bottom views, respectively, of one of the individual plant plug holders 203 shown in FIGS. 5-7. Lastly, while FIGS. 5-9 illustrate the preferred design of the individual plant plug holders 203, the inventors envision other designs may be utilized such as those described and illustrated in parent U.S. patent application Ser. No. 15/910,796, filed 2 Mar. 2018, the disclosure of which is incorporated herein by reference for any and all purposes.

Plant plug holding unit 201 is attached to rear tower surface 301 of tower face 101 via edge member 501, where edge member 501 encircles the plant plug holding unit as shown. Edge member 501 extends out and away from the sides of the plug holders, thereby allowing the front surface 503 of edge member 501 to be sealed to rear surface 301 of the tower face plate 101. Sealing the plant plug holding unit to the tower face inhibits leaking between the two parts. Preferably the seal completely circumscribes the plant plug holding unit as shown. Although a variety of techniques can be used to seal the two components together, preferably they are either bonded together (e.g., solvent bonding) or welded together (e.g., ultrasonic welding or vibration welding).

In the preferred embodiment, a front shroud 505 extends out and away from edge member 503. Preferably front shroud 505 extends into, and is sealed to, the tower face plate cut-out, thereby further inhibiting water from leaking out of the front of any of the plant plug holders integrated into the plant plug holding unit. In the preferred embodiment, front edge surface 507 of front shroud 505 is coplanar with the front surface of the tower face plate 101 (i.e., edge surface 507 is neither recessed relative to the front surface of the tower face plate nor does it extend out and away from the front surface of the tower face plate). This aspect of the plant plug holding unit is clearly visible in FIGS. 3 and 4. The inventors have found that having the front edge surface 507 coplanar with the front surface of the tower face plate 101 simplifies plant harvesting. In the illustrated embodiment, the distance 701 between the front face 503 of edge member 501 and the front surface 507 of front shroud 505 is approximately 0.10 inches. At least in the preferred embodiment, thickness 701 is dependent upon the wall thickness of the tower face plate 101.

Each individual plant plug holder 203 includes a base member 703 that extends rearward from the rear surface 705 of edge member 501. As base member 703 supports the plant plug and prevents it from sagging as it becomes saturated with water, preferably the base member 703 extends into the tower such that it almost touches the rear tower surface 303. Preferably the separation distance 305 between the rearmost edge 307 of base member 703 and the rear tower surface 303 is less than 0.1 inches, and more preferably set at approximately 0.07 inches. While it would not be detrimental to have the rearmost edge of the base member touch the rear tower surface, due to manufacturing tolerances, a small gap is preferred to insure that the plant plug holder properly fits within the tower face cut-out.

When the plant plug holding unit 201 is completely inserted into cut-out 103 such that front surface 503 of edge member 501 is flat against rear tower surface 301, base member 703 of each individual plant plug holder 203 is angled downwards as measured from the front to the rear of the member (see figures). While the plant plug holder of the invention may be used with a horizontally positioned base member and such a configuration does have advantages (e.g., simplifying the transplanting process), in such a configuration it is often difficult to prevent water from leaking out of the front of the plug holder. Accordingly, in the preferred embodiment the angle of base member 703 is in the range of 10 to 60 degrees off horizontal, and more preferably in the range of 40 to 50 degrees off horizontal.

Although there is preferably a slight separation between the rearmost edge 307 of base member 703 and the rear tower surface 303 as noted above, the plug holder is designed to insure that the rear surface of the plant plug 401 rests against the rear tower surface 303 as shown in FIG. 4. In the preferred embodiment, water and nutrients are directed towards the tower's rear inner surface 303 where they can then flow downward, feeding the plants contained in the individual plant plug holders 203. In order to help control water/nutrient flow along the back wall of the tower cavity to the plant plugs, preferably a series of vertical ridges are fabricated onto surface 303 as disclosed in co-assigned and co-pending U.S. patent application Ser. No. 15/910,601, filed 2 Mar. 2018, the disclosure of which is incorporated herein for any and all purposes.

In the preferred embodiment, base member 703 is tapered with the widest portion of the member being located at the front of the plug holder, and the narrowest portion of the member being located at the rear of the plug holder (i.e., proximate to rear tower surface 303). Since plant plugs are typically tapered, tapering the base member prevents it from unnecessarily blocking the inside of the tower. To reduce stress concentrations and improve the fatigue life of base member 703, preferably there is a fillet 707 between the bottom surface of base member 703 and surface 705 of edge member 501, and a fillet 901 between the side surface of base member 703 and surface 705 of edge member 501.

As shown in the figures, each individual plant plug holder 203 includes a top shroud member 709 that extends from back surface 705 of edge member 501. The top shroud 709 includes a solid portion 801 which is joined to back surface 503 at continuous junction 803. By including a solid portion 801 to top shroud 709, and one which is joined to the edge member along its entire width, water within the tower is prevented, or substantially inhibited, from leaking through the plug holder and out the front of the tower. Top shroud 709 is preferably tapered with the widest portion of the member being located at the front of the plug holder, and the narrowest portion of the member being located at the rear of the plug holder (i.e., proximate to rear tower surface 303).

Preferably the top shroud member 709 extends only a portion of the way from the edge member 501 towards rear tower surface 303, thus insuring (i) plenty of room for root growth out of the plant plug and (ii) that water and nutrients can easily reach the plant plug. However, limiting the length of top shroud member 709 also limits the extent to which it is able to protect the plant plug from erosion. Given this tradeoff, in the preferred embodiment and as illustrated in the figures, top shroud member 709 covers approximately half of the top surface of plant plug 401. It should be understood that given the trade-off between plug erosion and providing adequate room for root growth, individual plant plug holders may use a top member of a different length than that shown in the preferred embodiment. In those configurations utilizing a longer top member, apertures may be included in the top shroud, thereby providing more room for root growth and water/nutrient flow while still limiting plug erosion.

In addition to base member 703 and top shroud member 709, preferably each individual plant plug holder 203 includes a pair of side members 711. In the preferred and illustrated embodiment, the upper portion of each side member 711 extends rearward towards rear tower surface 303 to a lesser extent than the lower portion of each side member. Preferably and as shown, the upper side member portion extends rearward to approximately the same extent as top shroud member 709. As with top shroud member 709, this insures room for plant root growth as well as providing access to water and nutrients. Preferably the lower side member portion almost touches the rear tower surface 303 as shown. Extending the lower side member portions helps to define and maintain the position of each plant plug within the corresponding plant plug holder 203. In at least one embodiment, there is a fillet 903 between the side members 711 and the rear surface 705 of the plug holder's edge member 501. The fillet reduces stress concentrations and improves the fatigue life of the plug holder.

In the preferred and illustrated embodiment, there is an open slot 713 between each side member 711 and base member 703. By providing ample drainage about the plant plug, open regions 713 insure that water does not pool within the plug holder. Additionally by extending the open regions 713 all of the way to surface 705 of edge member 501 as shown, water is unlikely to leak out of the front of the plug holder. If additional plant plug drainage is desired, one or more apertures can be integrated into base member 703. It should be understood that while continuous open slots 713 are preferred in order to maximize drainage, these slots could be replaced with a series of drainage apertures. For example, the side members could extend to the base member, and a series of apertures could be integrated into the side members where the apertures are positioned along the top of the base member to prevent pooling.

In the preferred and illustrated embodiment, there is an open slot 715 between each side member 711 and top shroud member 709. Slots 715 insure adequate space for root growth.

The four members comprising each individual plant plug holder 203, specifically top shroud member 709, base member 703, and side members 711, are preferably tapered inwards as shown. The tapering angle is preferably slightly sharper than the tapering angle used on the plant plug (e.g., plant plug 401). For example, the sides of a typical plant plug are tapered at approximately 12 degrees. For this example the members comprising the plug holder are preferably tapered at approximately 14 degrees. By using a greater tapering angle than that of the plant plug, the plug must be compressed slightly as it is inserted into the plug holder, resulting in a tight fit. Given that the plug is comprised of soil or other suitable growth medium, plug compression does not create a problem during plug insertion into the holder. As noted above, preferably during plant plug insertion the plug is pressed into the plug holder until the plug's rearmost portion is resting against inner rear tower surface 303. It should be understood that top shroud member 709, base member 703, and side members 711 may utilize the same, or different, taper angles.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A hydroponic tower comprising:
    a tower face plate, said tower face plate comprising at least one cut-out, and
    a central cavity defined by the tower face plate and an inside rear wall opposite the tower face plate;
    a plant plug holding unit configured to be inserted into said cut-out of said tower face plate, said plant plug holding unit comprising:
    an edge member, said edge member encircling said plant plug holding unit and attached to the tower face plate; and
    one or more plant plug holders integrated into said plant plug holding unit, each plant plug holder comprising:
        a plant plug holder opening, said plant plug holder opening configured to receive a plant plug;
        a base member extending rearward from said edge member, said base member extending into the central cavity of said hydroponic tower such that a rearmost edge of the base member is substantially adjacent to the inside rear wall of the tower, said base member configured to support said plant plug within said plant plug holder;
        a top shroud member extending rearward from said edge member into the central cavity; and
        a pair of side members member extending rearward from said edge member, said pair of side members extending into said central cavity of said hydroponic tower, said pair of side members configured to maintain the position of said plant plug within said plant plug holder, wherein the inside rear wall comprises a series of vertical ridges.

2. The hydroponic tower of claim 1, wherein the base member is angled downwards.

3. The hydroponic tower of claim 1, said plant plug holding unit further comprising a front shroud, said front shroud extending out and away from said front surface of said edge member, wherein said front shroud encircles said at least one plant plug holder, and wherein said front shroud extends into said cut-out of said tower face plate.

4. The hydroponic tower of claim 2, wherein a front edge surface of said front shroud is coplanar with a front tower surface of said tower face plate when said plant plug holding unit is fully inserted into said cut-out of said tower face plate.

5. The hydroponic tower of claim 1, wherein a first side member of said pair of side members and a second side member of said pair of side members are tapered inwards, and wherein said base member and said top shroud member are tapered inwards.

6. The hydroponic tower of claim 1, wherein said top shroud member extends into the central cavity a portion of a distance between the tower face plate and the inside rear wall.

7. The hydroponic tower of claim 1, wherein a first junction between said top shroud member and said back surface of said edge member is continuous, wherein a second junction between a first side member of said pair of side members and said back surface of said edge member is continuous, and wherein a third junction between a second side member of said pair of side members and said back surface of said edge member is continuous.

8. The hydroponic tower of claim 1, wherein the rearmost edge of said base member is located within 2.54 mm (0.1 inches) of an inside rear wall of said central cavity of said hydroponic tower.

9. A hydroponic tower comprising:
a tower face plate, said tower face plate comprising at least one cut-out, and
a central cavity defined by the tower face plate and an inside rear wall opposite the tower face plate;
a plant plug holding unit configured to be inserted into said cut-out of said tower face plate, said plant plug holding unit comprising:
an edge member, said edge member encircling said plant plug holding unit and attached to the tower face plate; and
one or more plant plug holders integrated into said plant plug holding unit, each plant plug holder comprising:
a plant plug holder opening, said plant plug holder opening configured to receive a plant plug;
a base member extending rearward from said edge member, said base member extending into the central cavity of said hydroponic tower such that a rearmost edge of the base member is substantially adjacent to the inside rear wall of the tower, said base member configured to support said plant plug within said plant plug holder;
a top shroud member extending rearward from said edge member into the central cavity; and
a pair of side members member extending rearward from said edge member, said pair of side members extending into said central cavity of said hydroponic tower, said pair of side members configured to maintain the position of said plant plug within said plant plug holder;
a first open region located between said base member and a first side member of said pair of side members, said first open region directly adjacent to a top surface of said base member, said first open region configured to promote water drainage from said top surface of said base member; and
a second open region located between said base member and a second side member of said pair of side members, said second open region directly adjacent to said top surface of said base member, said second open region configured to promote water drainage from said top surface of said base member.

10. The hydroponic tower of claim 9, wherein the base member is angled downwards.

11. The hydroponic tower of claim 9, wherein said first open region is configured as a first open-ended slot, and wherein said second open region is configured as a second open-ended slot.

12. The hydroponic tower of claim 9, wherein a first side member of said pair of side members and a second side member of said pair of side members are tapered inwards, and wherein said base member and said top shroud member are tapered inwards.

13. The hydroponic tower of claim 9, said plant plug holding unit further comprising a front shroud, said front shroud extending out and away from said front surface of said edge member, wherein said front shroud encircles said at least one plant plug holder, and wherein said front shroud extends into said cut-out of said tower face plate.

14. The hydroponic tower of claim 9, wherein the rearmost edge of said base member is located within 2.54 mm (0.1 inches) of an inside rear wall of said central cavity of said hydroponic tower.

15. A hydroponic tower comprising:
a tower face plate, said tower face plate comprising at least one cut-out, and
a central cavity defined by the tower face plate and an inside rear wall opposite the tower face plate;
a plant plug holding unit configured to be inserted into said cut-out of said tower face plate, said plant plug holding unit comprising:
an edge member, said edge member encircling said plant plug holding unit and attached to the tower face plate; and
one or more plant plug holders integrated into said plant plug holding unit, each plant plug holder comprising:
a plant plug holder opening, said plant plug holder opening configured to receive a plant plug;
a base member extending rearward from said edge member, said base member extending into the central cavity of said hydroponic tower such that a rearmost edge of the base member is substantially adjacent to the inside rear wall of the tower, said base member configured to support said plant plug within said plant plug holder;
a top shroud member extending rearward from said edge member into the central cavity; and
a pair of side members member extending rearward from said edge member, said pair of side members extending into said central cavity of said hydroponic tower, said pair of side members configured to maintain the position of said plant plug within said plant plug holder; and
a first open region located between said top shroud member and a first side member of said pair of side members, said first open region directly adjacent to a lower surface of said top shroud member; and a second open region located between said top shroud member and a second side member of said pair of side members, said second open region directly adjacent to said lower surface of said top shroud member.

16. The hydroponic tower of claim 15, wherein the base member is angled downwards.

17. The hydroponic tower of claim 15, wherein said first open region is configured as a first open-ended slot, and wherein said second open region is configured as a second open-ended slot.

18. The hydroponic tower of claim 15 further comprising
a third open region located between said base member and a first side member of said pair of side members, said first open region directly adjacent to a top surface of said base member, said third open region configured to promote water drainage from said top surface of said base member; and
a fourth open region located between said base member and a second side member of said pair of side members, said second open region directly adjacent to said top surface of said base member, said fourth open region configured to promote water drainage from said top surface of said base member.

19. The hydroponic tower of claim 15, wherein said third and fourth open regions are configured as open-ended slots.

20. The hydroponic tower of claim 15, wherein a first side member of said pair of side members and a second side member of said pair of side members are tapered inwards, and wherein said base member and said top shroud member are tapered inwards.

* * * * *